June 3, 1969  P. GIUIUZZA  3,447,456
MULTI-UNIT PRINTING MACHINE DRIVE CONTROL
Filed June 22, 1966

INVENTOR.
Pietro Giuiuzza
BY
Michael S. Striker

United States Patent Office 3,447,456
Patented June 3, 1969

3,447,456
MULTI-UNIT PRINTING MACHINE DRIVE CONTROL
Pietro Giuiuzza, Milan, Italy, assignor to O.M.C.S.A. Officine Meccaniche Cigardi S.p.A., Milan, Italy, a corporation of Italy
Filed June 22, 1966, Ser. No. 559,535
Claims priority, application Italy, June 24, 1965, 14,076/65
Int. Cl. B41f 5/16, 5/18, 13/24
U.S. Cl. 101—183         3 Claims

ABSTRACT OF THE DISCLOSURE

The motor shaft of each unit of a multi-unit printing machine, is provided with a flywheel to reduce the acceleration occurring upon disturbance of the respective printing means. At the same time, the number of openings in the light barrier cooperating with photoelectric sensing means is increased as compared with the prior art. Since the acceleration of the light barrier is reduced by the flywheel, the number of openings in the light barrier must be selected high enough to produce a control signal indicating the disturbance a sufficiently short time after occurrence of the disturbance.

---

The present invention generally relates to multi-unit printing machines and, more particularly, it is related to the drive control of individually motor driven units of multi-unit rotary printing machines, in particular of the "off-set" type, and has for its principal object the improvement of both the quality of print and the speed and the production of the press.

It is well known that such multi-unit machines, which are generally made use of for multi-color printing, the various successive printing units have to run at an exactly predetermined angular position with each other to assure proper alignment of the colors which are respectively applied by the successive units to the sheets passing therethrough. The motors which individually drive the said successive units are therefore controlledly fed to assure the desired angular relationship and the simultaneous drive at synchronous speeds of said units. The actual variation from the theoretical perfect angular relationship, or "phase" of successive units, is commonly termed as "error" and the quality of the print is a function of the amplitude of such error, as said error is obviously detrimental for the precise superimposing of the different colors which have been respectively printed by each individual unit as the sheets which have been progressed therethrough.

According to the most advanced techniques, in particular in the construction of large and speedy printing presses including a relevant number of units, say four or more units, for example, each unit is driven by variable speed DC fed electric motor and no mechanical connection exists between the successive units. Each individual motor is supplied with electrical energy by means of controlled sources responsive to signals indicative of the speeds and of the angular relationship of the various units, to maintain the desired phased and synchronous drive and to zeroing the error as soon as a variation from said relationship actually occurs.

It has been heretofore proposed to control the actual speed of one unit—which therefore acts as a "pilot" unit—of the multi-unit press, by applying a reference potential to the supply circuitry feeding the motor of said unit, and then to synchronize and phase the other units with respect to said one unit, the regular operation of the press being ensured by detecting the error which may occur between said one and respectively the other units, and provide therefor by suitably modifying the supply of the electrical energy to the motors individually connected to said other units.

An accepted means for controlling the instantaneous angular positions rotating members appertaining to differing printing units comprises discs adapted to individually rotate synchronously with said members and having an angular position indicating marking thereon, means for impinging light upon said discs and markings, and photosensitive means positioned and adapted for being light excitated as said markings are passing at a predetermined angular position at each revolution of said discs, to provide an electrical signal indicative of such passage. The signals supplied by said photosensitive means, namely a photocell, are fed into comparing means comprising integrator means to provide an output potential proportional to the amplitude and direction of the time interval at which the signals have been applied into said comparing means, that is proportional to the amplitude and direction of the error, for deriving resultant synchronization control potentials which are at their turn applied to the control means of the controlled sources of energy by which the motors are individually fed, to impart to said motors and to the units driven thereby the suitable positive or negative acceleration as necessary for zeroing the error. The error is zeroed as exactly simultaneous signals are provided and compared.

A circuit arrangement for the synchronization and speed control of the above type, for synchronizing and controlling the speeds and the angular relationship of printing units of multi-unit and multi-color presses of the character referred to above, and the means and devices related to said arrangement, have been detailedly described in the United States Patent No. 3,073,997. The present invention will be hereinbelow described as being applied and operated in combination with an arrangement of the type described in said prior patent or with an arrangement equivalent thereto, including photosensitive means arranged and connected in the circuitry to provide comparable signals indicative of the actual angular relationship of rotating members individually appertaining to individual printing units of the above considered presses or printing machines, said combination being however not limitative of the scope and objects of this invention, as said invention can be easily adapted to provide an angular relationship control of multi-unit printing machines comprising suitably arranged controlledly supplied motors.

In the actual operation of printing presses of the type considered, certain serious problems have been encountered as attempts have been made to improve the quality of print, that is reduce the error amplitude and to attain the most desirable high rotational speed of the printing rotary components. In particular, the most desirable very small error amplitude within which the variation from the angular relationship should be confined to ensure to high quality of print, has been proved to be ensured if the press is being run at undesirably low speed. It is to be taken in mind that a tendency exists to limit said error within values corresponding to 0.02 millimeters and even less, measured on the periphery of the printing or impression cylinders.

Attempts to compress the error within such small values, in speedy running machines, have failed, for example, an unpredictable phenomena of unstability and hunting have been developed.

According to the invention, it has been found that a critical relationship exists and ought to be dealt with between the inertial mass of the rotating parts and the time interval between each subsequent angular position relationship indicative signals. In particular, whilst a greater inertial rotational mass would decrease the amplitude of an error which may develop in a given time, as said mass would decrease the negative or positive acceleration resulting from an unpredictable increasing or decreasing resistance to the rotary motion of an unit, such greater mass would require a greater corrective force, that is a more powerful control for contrasting said acceleration and reversing the same to restore the desired angular relationship. The great corrective force, as the said acceleration is reverse, will induce the development of another error of opposite sign, leading to an opposite control and corrective action and to the objected hunting. Under certain resonance conditions, an impressive flutter phenomenon may develop.

A too little inertial mass, while undesirable as leading to structural weakness and failure and to elastical deformation of the components, is at its turn of prejudice in view of proper operation of the press as the unpredictable disturbing forces (such variations of the resistance) will induce greater positive or negative accelerations leading to an increased error amplitude before that the error is detected by the angular relationship control means, and a proportionally greater corrective force is to be applied for overwhelming the force resulting from the relatively limited but greatly accelerated rotating masses.

It is therefore a specific object of this invention to provide a new and improved multi-unit printing machine drive and in particular angular relationship control, which is not subject to the above and other objections.

The above and other objects of the invention will be made clearly apparent from the following detailed description of a preferred embodiment of the invention, taken in conjunction with the accompanying drawing, and forming an essential component of this disclosure, and wherein.

Figure 1:
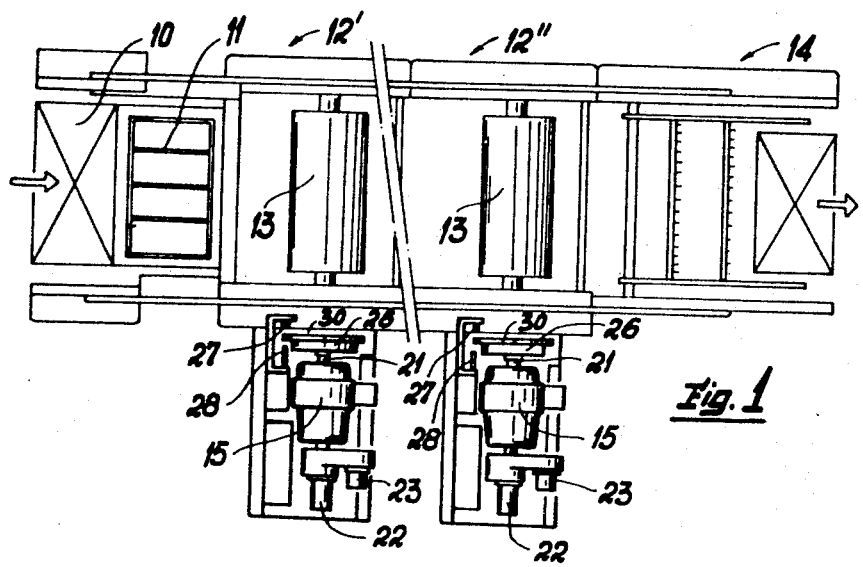
FIGURE 1 is a fragmentary plan view of a multi-unit printing machine of the type discussed above and provided with the control arrangement of the invention. The structure and the components of the press are rather diagrammatically shown while the drive means have been evidenced.

Referring now to the drawing, wherein like numerals refer to like or equivalent parts throughout the various figures: In FIG. 1 a conventionally constructed multi-unit printing press is shown, comprising at least two and in general a pretty relevant number of units. In the drawing the first and the last unit have been illustrated, for simplicity sake, upon the consideration that, as far as the invention is concerned, the parts, components and arrangement hereinafter described are similar in any and each printing unit. Among its essential components, the press include a feeder 10 and progressing means 11 to sucessively feed the sheets to be printed into the first printing unit 12′, which provides the printing of a first color thereon and then transfers same sheets to the subsequent adjacent unit, and so on until the completely printed sheets are conveyed from the last unit 12″ to an output or delivery assembly 14. The various impression and transfer cylinders of the units are diagrammatically shown and indicated at 13.

Further according to conventional art, each printing unit is individually driven by its own DC fed driving motor adapted to run at controlled differing speeds, and supplied with DC current by a controlled source of electrical energy, not shown. Such source and the means provided for controlling the output thereof can be those described in the said U.S. Patent No. 3,073,997. Each motor, generally indicated at 15, is drivingly connected to the rotary printing means of its respective unit by means of a suitable gearing comprising, for example, a pinion 16 connected to the motor shaft 21, a first driven gearwheel 17 and having a second pinion 18 co-axial and secured thereto, and a second driven gearwheel 19 in mesh with said second pinion 18 and connected to a cylinder 13 of the unit by means of adjustment means such as indicated at 20.

The said gearing, the structural details of which do not appertain to this invention and therefore will not be further described, is designed to provide a proper transmission ratio between the motor shaft 21 and the cylinders. In the most of the presses of the type considered, such ratio is of the order of 1 to 20. The said DC motors are generally controlled by controlling the armature voltage thereof.

Still further according to current knowledge, each motor 15 is connected to a tachometer generator 22 designed to provide an output potential proportional to the angular velocity of the motor and to a "synchro" 23, said "synchro" being driven via a gearing 24, 25 providing a transmission ratio equal to the said ratio between the motor shaft 21 and the cylinders 16 of the respective printing unit. The various "synchro" devices are connected to provide a first approximate synchronization of the various printing units, upon connection of the output terminals thereof to a known control circuitry, as described in the above indicated prior patent, for example. Each unit drive assembly includes further an angular position control system including a photosensitive element, a source of light directed to impinge light of said element and rotary means, such as a disc 30, apertured to provide that the light emitted by said source will reach said element at least at one predetermined angular position of said disc, which is secured to the motor shaft 21 for rotation therewith.

Figure 3:
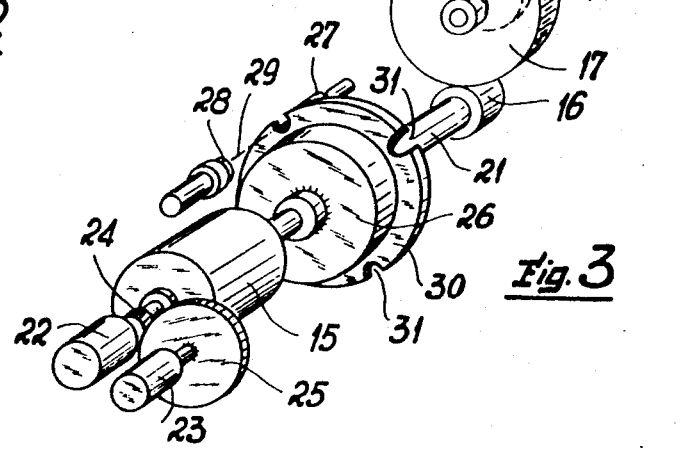
FIGURE 3 is a diagrammatical perspective illustration of an arrangement according to the invention.

According to the invention, the said motor shaft 21 is further rotationally connected to a rotary body having a substantial inertial mass, such as a flywheel 26, and the said disc 30 is provided with a plurality of apertures 31 evenly positioned about its peripheral edge, the said photosensitive element, such as a photocell or a photodiode 28 and the said source of light, such as a lamp 27, being located at opposite sides of said peripheral edge of disc 30 so that the light can impinge on said photocell 28 only when one aperture 31 of the disc is located in the path, indicated at 29 in FIG. 3, of the light between source 27 and element 28. Said plurality of apertures preferably but not necessarily comprises four apertures.

Figure 2:
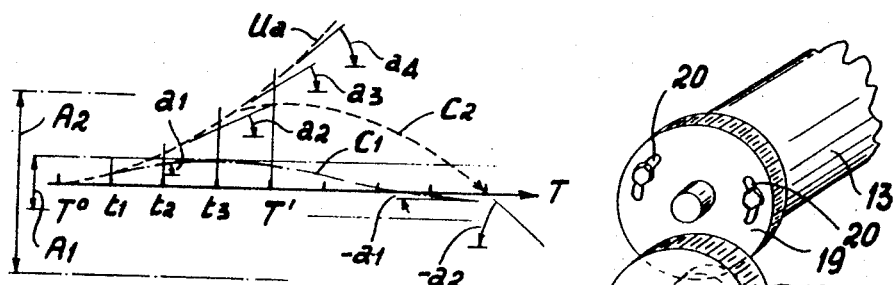
FIGURE 2 is a graph wherein exemplificative speed variations have been indicated in function of time.

The result of said combination and arrangement of elements, parts and means will be now discussed with reference to the graph of FIG. 2, wherein the internal T°–T′ on the abscissa T indicates the time in which the motor shaft completes one revolution and, in general a given time from instant T° at which a disturbing phenomenon, such as a sharp variation of the resistance to the motion of the rotary components on one printing unit occurs. The curve $Ua$ is representative of the variation of the angular speed of the disturbed unit, as a consequence of the disturbing force which will induce an acceleration in the rotating masses of the unit. It will be evident that as the disturbing force is applied, the angular speed will vary with respect to the regular service speed at T° (indicated by the abscissa) according to a function of the type indicated at $Ua$, wherein its successive derivatives at successive instants $t_1$, $t_2$, $t_3$ will become greater, as indicated at $a_1$, $a_2$, $a_3$, $a_4$. Such derivatives indicate the ever increasing acceleration imparted to the rotating masses of the disturbed unit.

In the rotational mass of the rotary components is increased, the curve $Ua$ will correspondingly be flattened, upon the increasing of the first factor of the product "mass by acceleration," which, for any given disturbing force, is a constant. Therefore, in view of the opposite force which is to be applied to the rotating components for overwhelming the disturbing force, to increase the said rotational mass, as individually considered, would be useless, as said opposite force will not be modified.

Let us now assume that the photoelectric control is applied at time intervals corresponding to $T°-t_2$. The control exerted in the instant $T°$ does not detect any variation of phase and no control and adjustment action is done. As the subsequent control is exerted at instant $t_2$, an error will be detected in the angular relationship, whilst the rotating masses possess the acceleration $a_2$. The control and adjustment circuitry will be therefore activated and its action will modify the uncontrolled curve $Ua$ to the curve $C_2$, and the increasing of the speed will be progressively zeroed and then reversed, say at instant $T'$. The subsequent negative increment of speed causes a corresponding negative acceleration to be induced, such negative acceleration being great, such as indicated at $-a_2$ where the speed is restored at the desired value indicated by the abscissa.

An opposite substantial force will occur, inducing an opposite substantially error which require counteraction and the actual speed will oscillate above and below the abcissa within a large range of values, such as indicated at $A_2$.

Assuming now that the photoelectric controls are exerted at smaller time intervals, such as interval $T°-t_1$ ($T°-t_2:2$), two important effects will be attained: (a) the corrective action has to deal with a smaller acceleration $a_1$; (b) from the instant at which the variation of speed is reversed (at instant $t_3$ about) a plurality of further photoelectric controls will be done before that the actual instantaneous speed will equalize the reference speed indicated by the abscissa, that is the resulting curve $C_1$ will intersect said abscissa, said plurality of control detecting errors of successively decreasing amplitude and therefore inducing counteractions of successively decreasing intensity.

Therefore, the speed variation will be anyway compressed within a very smaller range, such as indicated at $A_1$, and the negative acceleration $-a_1$ existing at the instant at which the actual speed correspond to the reference speed will be very small and, in particular, much smaller than the acceleration $a_1$ existing at the instant $t_1$ at which the photoelectric control has firstly detected the occurring error. The speed variations promoted by the control and adjusting arrangement will therefore be promptly dampened and the very prejudicial hunting phenomena prevented.

It has been found that said time intervals, between photoelectric error control and detection, cannot be limited at will, as overload and overwork will occur in electrical and electronical components of the circuitries. Four controls during a complete revolution of the printing units drive motors (80 controls at any revolution of the printing cylinders) have been found to be practically feasible in current and currently fed printing machines of the type considered. Therefore, a flattening and elongation of the curves of speed variation had been found actually necessary for ensuring that a number, preferably greater than four, of photoelectric controls will occur in the time interval between first detecting of an error and the instant at which the speed of the unit, subjected to the error, firstly equalize the reference speed, for ensuring proper dampening of the speed variation.

The preferred mode for flattening and elongating said curve is to increase the inertial mass of the rotating assembly by securing a proper flywheel to the motor shaft, as diagrammatically illustrated in FIG. 3, the diameter and the weight of said flywheel being selected by experimentation on the base of curves, such as discussed above, plotted during factory tests. Provided that a prompt and sure dampening of the speed variation is ensured, the elongation of said curve is not of prejudice as it does not effect the error. In other words, as an error has been promptly detected upon proper limitation of the interval between photoelectric controls, the time in which such error is actually zeroed is not of importance, whilst, according to a current tendency, intense counteractions are deemed necessary for zeroing the error as quickly as possible. According to the invention, it has been found that such tendency leads to impossible compression of the error amplitude and to cause hunting phenomena, when the machine is being run at currently desirable service speed and its adjustment and control circuitries are attempted to confine the error at the most desirable tiny error amplitude for high quality printing.

What is claimed is:

1. Drive control arrangement for a multi-unit printing machine, comprising, in combination, a series of units, each unit including a rotary printing means, a motor having a shaft, and a transmission connecting said shaft with said printing means and having a high transmission ratio so that said shaft rotates at a substantially higher number of revolutions than said printing means; photoelectric sensing means; a rotary light barrier fixed to said shaft and having a selected number of circumferentially spaced openings cooperating with said sensing means so that the same generate the same number of signals during each revolution of said motor and shaft, said signals being produced at a normal frequency during normal operation of said printing means and at an increased frequency upon acceleration of said printing means, motor, shaft, and light barrier to an increased number of revolutions due to a disturbance of the operation of said printing means whereby the increased frequency of the signals of the disturbed unit can be compared with the normal frequency of signals generated by other units for corrective action; and a flywheel fixed to said shaft and having a mass selected to increase the inertia of said motor, shaft, light barrier, transmission, and printing means so that a disturbance of the operation of a printing means causes a comparatively slow acceleration of said shaft and of said light barrier; the number of openings in said light barrier and the mass of said flywheel being selected so that upon a disturbance, a signal for starting a corrective action is generated by said sensing means such a short time after occurrence of the disturbance that the printing means of the disturbed unit is not yet substantially out of phase with the printing means of the other units.

2. Drive control arrangement as claimed in claim 1 wherein said transmission has a ratio of at least 20:1 so that said printing means makes one revolution during twenty revolutions of said motor, shaft, flywheel, and light barrier, and wherein said light barrier has at least four of said circumferentially spaced openings whereby said signal for starting corrective action is given by said sensing means after one eightieth part of the revolving of the disturbed printing means following the disturbance.

3. Drive control means as claimed in claim 2 wherein said light barrier is a circular disk having said four openings in the form of uniformly spaced peripheral notches.

References Cited

UNITED STATES PATENTS

| | | | |
|---|---|---|---|
| 707,390 | 8/1902 | Churchward | 318—184 XR |
| 2,978,619 | 4/1961 | Allgeyer et al. | 318—161 XR |
| 3,073,997 | 1/1963 | Tagliasacchi | 101—248 XR |
| 3,231,807 | 1/1966 | Willis | 318—313 |
| 3,311,803 | 3/1967 | Schulz | 318—85 |

FOREIGN PATENTS 536,923   2/1957   Canada.

ROBERT E. PULFREY, *Primary Examiner.*

J. REED FISHER, *Assistant Examiner.*

U.S. Cl. X.R.

101—248